United States Patent [19]

Lawrence

[11] 4,265,708
[45] May 5, 1981

[54] RADIALLY CHANNELED GUIDE POST FOR A NUCLEAR FUEL ASSEMBLY

[75] Inventor: Frederick D. Lawrence, Suffield, Conn.

[73] Assignee: Combustion Engineering, Inc., Windsor, Conn.

[21] Appl. No.: 973,502

[22] Filed: Dec. 26, 1978

[51] Int. Cl.³ .......................... G21C 3/30; G21C 7/08
[52] U.S. Cl. ........................................ 176/78; 176/35; 176/81; 239/552
[58] Field of Search .................. 176/35, 36, 65, 56, 176/76, 78, 81, 86 R, 87; 137/561 A, 597, 599; 251/24; 239/493, 518, 520, 552

[56] References Cited

U.S. PATENT DOCUMENTS

| 3,432,390 | 3/1969 | Dean | 176/78 |
| 3,619,367 | 11/1971 | Gumuchian | 176/78 |
| 3,770,583 | 11/1973 | Klumb | 176/78 |
| 3,861,999 | 1/1975 | Zmola | 176/78 |

OTHER PUBLICATIONS

Fricke, Nuclear Science & Engineering: 48, 87–102, (1972).
Miller et al., "Theoretical Analysis of Flow–Induced Vibration of a Blade, etc.", ASME, 11/27/66.

Primary Examiner—Donald P. Walsh
Attorney, Agent, or Firm—L. James Ristas

[57] ABSTRACT

An improved nuclear reactor fuel assembly of a type having a control rod guide tube through which a control rod may be reciprocated from above and through which a coolant flow is maintained from below wherein the improvement comprises the guide tube having a flow restriction at its upper end and having a plurality of flow bypass channels spaced around the tube circumference below the restriction for directing coolant flow generally radially outward from the guide tube.

4 Claims, 3 Drawing Figures

RADIALLY CHANNELED GUIDE POST FOR A NUCLEAR FUEL ASSEMBLY

BACKGROUND OF THE INVENTION

This invention relates to reducing the flow induced vibration of a center body member within a conduit having an abrupt increase in cross section, and in particular to reducing the vibration of a nuclear reactor control rod in its guide tube.

The fission rate and thus the heat generation in modern power reactors is usually controlled by the insertion and removal of control rods into or between fuel assemblies in the reactor core. Particularly in reactors of the pressurized-water type, cylindrical control rods are reciprocated within guide tubes which are part of the fuel assembly. The fuel assemblies are subjected to the flow of primary coolant in order to remove the heat generated in the fuel. When in the core, control rods also produce heat through the nuclear transformation associated with their high neutron absorption rate, and so the control rods must also be cooled. Thus a requirement is imposed on the design of the guide tube for assuring that a minimum flow rate through the guide tubes will exist at all times.

During power production most of the control rods are maintained in a withdrawn position above the core. The lower tips of the rods, however, are not completely withdrawn from the guide tubes. Recent operating experience has shown that rodded fuel assemblies that have been in an operating reactor for a period of time have significant wear on the inner walls of the guide tubes at precisely the elevation corresponding to the withdrawn control rod tips.

It is known that under some conditions a self-excited vibration of a blade-type control element can occur when the insertion of the blade into a narrow upstream section of the flow path between fuel assemblies is less than a critical distance. Also, the fluid flow rate through the path must exceed a critical value for this vibration to occur. Suggestions have been made for reducing these vibrations by inserting labyrinth-type flow restrictions at various locations along the flow path downstream of the leading end of the blade, or by introducing a mechanical restraint to provide a lateral force which prevents the build up of small random vibrations.

Flow induced periodic vibrations have also been observed in arrangements having a cylindrical rod eccentrically located in an annular diffuser. It is believed that two kinds of vortices interact to produce the periodic driving force. The first kind, axial vortices, originate in the region of the rod tip and travel along the rod before entering the diffuser region where vortex bursting occurs. The other kind, diffuser vortices, form as a contrarotating pair in the diffuser region as a result of the separated flow pattern surrounding the eccentric rod. These two kinds of vortices interact to produce the periodic driving force on the rod in the diffuser region. It has been proposed to provide a circumferential fence in the flow path downstream of the diffuser, or to provide strakes in the outer wall of the diffuser starting at the diffuser mouth and extending longitudinally downstream of the diffuser. These solutions are not practical for use in nuclear reactors because the diffuser region can be very large.

Since nuclear reactor control rods often are not exactly centered in their guide tubes, the rod tip has a tendency to assume a rest position against the inner wall of the tube. Any significant tip vibration against the inside of the guide tube could produce wear on the inner wall and ultimately perforate the guide tube. It has been found that, except for significantly reducing the mass flow rate in the guide tube, the above suggested remedies for reducing flow induced vibration of a control rod are only marginally effective. If the flow rate is reduced sufficiently to eliminate vibration, it is often not possible to adequately cool the control rod.

SUMMARY OF THE INVENTION

It is an object of the invention to provide an improvement for reducing the flow induced vibration of an elongated cylindrical control rod disposed in a control rod guide tube having a diffuser region downstream of the control rod tip.

It is a further object to provide an improved fuel assembly that will greatly reduce the flow induced vibration of a nuclear reactor control rod suspended in the withdrawn position in a guide tube.

It is another object to provide a fuel assembly having guide posts at its upper end that suppress flow induced control rod vibration yet do not interfere significantly with control rod scram nor significantly impede the upward flow of coolant.

According to the invention there is provided an improved nuclear reactor fuel assembly of a type having a control rod guide tube through which a control rod may be reciprocated from above and through which a coolant flow is maintained from below wherein the improvement comprises the guide tube having a flow restriction at its upper end and having a plurality of flow bypass channels spaced around the tube circumference below the restriction for directing coolant flow generally radially outward from the guide tube.

BRIEF DESCRIPTION OF THE DRAWINGS

Other objects and advantages of the invention will be evident from the accompanying description and drawings in which.

DESCRIPTION OF THE PREFERRED EMBODIMENT

Figure 1:
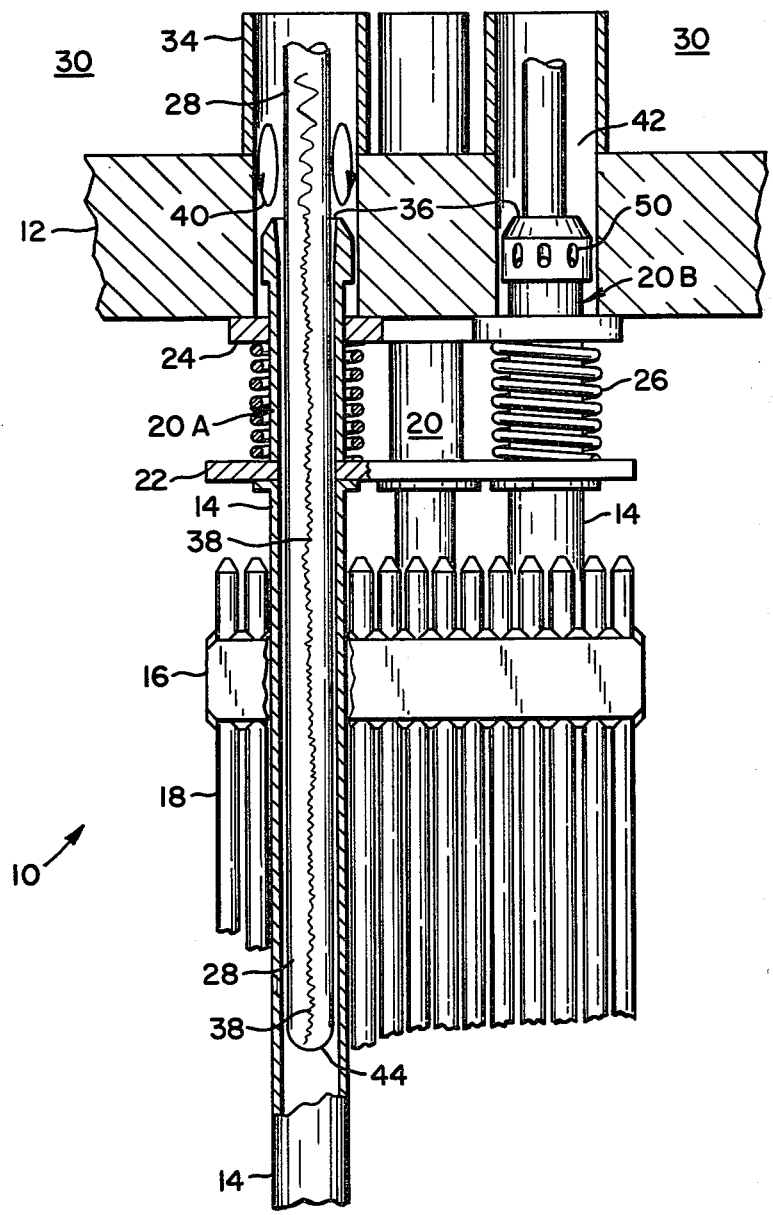
FIG. 1 is a partially sectioned elevation view of the upper end of a fuel assembly showing the interface with the upper guide structure and control rods.

FIG. 1 shows the upper portion of a nuclear reactor fuel assembly 10 engaged with the fuel alignment plate 12 during typical nuclear reactor operating conditions. The fuel assembly 10 includes a plurality of guide tubes 14 to which are attached fuel spacer grids 16 which form a matrix to support a plurality of fuel elements 18. The guide tubes 14 typically extend a distance of approximately 13 feet from the fuel alignment plate 12 to the fuel assembly lower end fitting (not shown). The guide tubes 14 have giude posts 20 welded to their upper ends and are rigidly connected to a perforated flow plate 22. A spider-shaped holddown plate 24 having one lobe associated with each guide post 20 is located below the alignment plate 12 and is vertically movable relative to the guide post in order to tansmit a downward force from the alignment plate 12 through the holddown springs 26 to the guide tubes 14 whereby the assemby is held down against the upward flow of coolant over the fuel elements.

During the course of their lifetimes within a reactor, most assemblies 10 will have control rods 28 located within the guide tubes 14. The control rods 28 are typically about 15 feet long and are rigidly held at their upper ends (not shown) and reciprocated vertically within the guide tubes 14. The control rod 28 is protected from the highly turbulent coolant flow that interacts with the fuel elements 18 below the alignment plate 12, and from the strong cross-flows existing in the plenum region 30 above the alignment plate 12. This protection is afforded by the guide tube 14, the post 20, the alignment plate 12, and shrouds 34 in the plenum region 30. Although not shown, the alignment plate 12 has a plurality of flow passages for directing the coolant flow from the fuel assemblies 10 into the plenum region 30.

A continuous flow of coolant must be maintained within the guide tube 14 to provide cooling to the control rods 28. Because the control rods 28 are so elongated, each rod is unlikely to be exactly centered within its respective guide tube 14 and therefore, especially when the rod is in the withdrawn position shown in FIG. 1, the rod will be eccentric relative to the guide post exit 36. It is believed that such eccentricity produces a pattern of axial vortices 38, with axes generally vertical, and diffuser vortices 40, with axes generally in a horizontal plane, as schematically represented. The structure associated with the control rod 28 as it exits the guide posts 20 can be generally described as a center rod eccentrically disposed within a rather abrupt diffuser region represented generally at 42. It should be appreciated that depending on the particular nuclear reactor, the exact structure defining the diffuser region 42 and the diffuser cross section can be quite different.

During reactor operation, most control rods 28 are maintained in the withdrawn position so that the control rod tip 44 is continuously located, depending on the particular reactor, at a fixed elevation approximately 1 to 2 feet from the guide post exit 36. Inspection of fuel assemblies 10 removed from operating reactors shows severe fretting on the inside of the guide tube 14 at precisely the elevation corresponding to the control rod tip 44 in the withdrawn position. Analyses were made and tests outside the reactor were performed in order to identify the mechanism causing the guide tube wear. Although the source of wear has not been completely explained analytically it was found that the vibrations causing the control rod interaction with the guide tubes 14 are apparently self-excited and predominantly at the natural frequency of the control rod (about 4H for a typical control rod). These vibrations are believed to be the result of guide tube flow effects caused by driving forces related to the periodic interaction near the guide post exit 36 of the axial vortices 38 with the diffuser vortices 40, as described above.

A variety of proposed improvements were tested in a flow loop wherein the dimensions and flow rates were similar to typical reactor operating conditions. Most of the tested guide posts had very little effect in reducing the vibration of the control rod in the guide tube 14. The present invention was effective in reducing control rod vibration. An invention described in another patent application field on even date herewith entitled "Parallel Flow Collar for Reducing Vibration of a Rod Within a Diffuser", by F. Bevilacqua, and assigned to the same assignee as the present invention, was, however, most effective.

Figure 2:
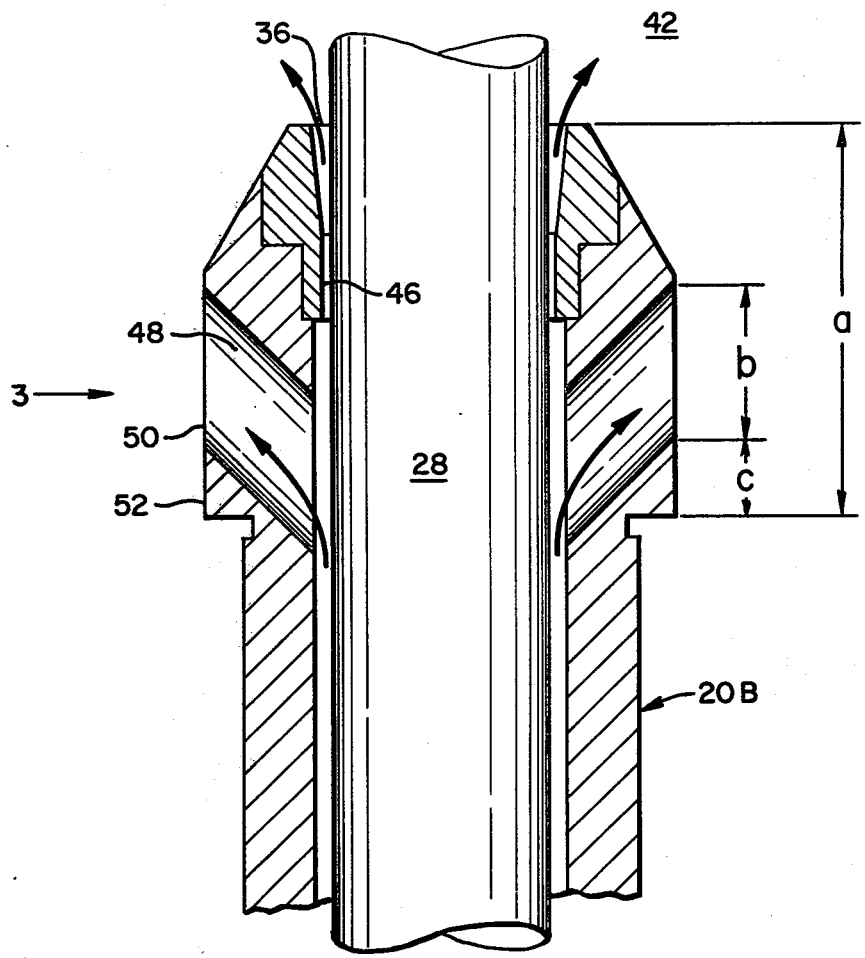
FIG. 2 is a sectioned elevation view of the preferred embodiment of the invention, with the rod inserted therein.
Figure 3:
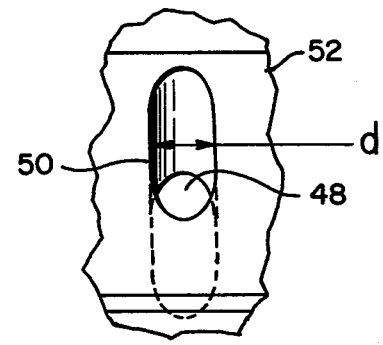
FIG. 3 is a side view along the line 3 of FIG. 2.

FIGS. 2 and 3 show the preferred embodiment of the improved guide post 20B having a uniform inner diameter that is the same as the inner diameter of the guide tube 14 except that at the upper end of the post 20B the inner diameter is reduced to form a flow restriction 46. In this embodiment of the invention the tube and post inner diameter are 0.900 inches for receiving a control rod 28 having an outer diameter of 0.816 inches. The flow restriction 46 has an inner diameter of 0.860 inches. Generally, the flow restriction is chosen to be as narrow as will permit acceptable control rod scram time.

Immediately below the restriction 46 there are provided a plurality of bypass channels 48 which divert most of the coolant away from the rod 28. This reduces the velocity of the coolant exiting the guide post 20B at the diffuser mouth 36 immediately adjacent to the control rod 28. Although the flow exiting the post at 36 may produce the diffuser vortices 40 (since the rod is still eccentric relative to the exit cross section), the bypass flow through the channels 48 enters the diffuser region 42 spaced away from the control rod 28. In addition, the axial vortices 38 are dissipated or at least distributed in a manner that minimizes their periodic interaction with the diffuser vortices 40

Since the exact mechanisms causing the control rod vibration are not thoroughly understood, the foregoing explanation cannot be analytically demonstrated. It is believed, however, that at least four discrete flow channels are preferred. The illustrated embodiment has eight flow channels symmetrically located about the upper portion of the guide post, each channel being upwardly oriented at approximately 45 degrees to the horizontal. This orientation minimizes the pressure drop in the guide tube. Preferably, the flow channels are located such that the channel exits 50 are in the enlarged head 52 of the guide post 20B in order that the diverted flow exits as far as possible from the post exit 36.

As an example of the improvement provided by the preferred embodiment of the invention, the results of comparative flow test on a guide tube 14, guide post 14, diffuser region 42 and shroud 34 equivalent to the structure shown in FIG. 1 will be discussed. In the tests the guide tube 14 inside diameter was 0.900 inches and the control rod outside diameter was 0.816 inches. The control rod 28 was 14 feet long and fixedly suspended at its top. The mass of the control rod 28 was equivalent to a stainless steel clad column of $B_4C$ pellets. The rod tip 44 was located 21 inches below the guide post exit 36. The standard prior art post 20A was similar to that depicted in FIG. 1 and had an inside diameter of 0.900 inches. Accelerometer probes were connected to the midspan of the control rod 28. At the typical operating volumetric flow rate of 9 gallons per minute (4500 lbs. per hour) flow through the guide tube and standard post 20A, the rod response was 0.23 g's. Since the guide tube 14 in the test model was made of plexiglass, the control rod tip 44 could be observed vibrating against the guide tube 14 inner wall. The test was repeated with the same flow conditions using the improved guide post 20B shown in FIGS. 1, 2 and 3. Eight flow channels at angles of 45 degrees were provided. The dimensions indicated by lower case letters in FIGS 2 and 3 were as follows:
 a=1.375 inches
 b=0.600 inches
 c=0.200 inches
 d=0.25 inches
The variation in the angle of the transition from the restriction 46 to the post exit 36 was six degrees, but this parameter was found to have little effect on the control rod vibration.

With the improved guide post 20B, the acceleration response at the rod midspan dropped down to 0.17 g's. There was a visible oscillation of the control rod but the tip 44 did not touch the guide tube 14. Although the present invention was not as effective in reducing control rod vibrations as was the invention claimed in the above-mentioned related application, the present invention is easy to implement in fuel assemblies that have already been built. It is also an inexpensive way to provide a safety margin in new assemblies where the prior art guide posts are barely acceptable.

I claim:

1. In a nuclear reactor fuel assembly having a control rod guide tube including a guide post at its upper end, the guide post having a uniform inner diameter, the tube and post adapted to receive a reciprocating control rod from above and a coolant flow from below, wherein the improvement comprises the guide post having an upper portion with a flow restriction having a smaller diameter than the remainder of the tube, and wall means defining a plurality of flow relief channels spaced around the circumference of the post, the channels extending in a generally radial direction from inside the tube below the flow restriction to openings on the surface of the guide post.

2. The fuel assembly of claim 1, wherein the guide post includes a head portion having a larger outside diameter than the remainder of the guide poast, and wherein the flow restriction is within the head portion and the relief channel openings are on the outer surface of the head portion.

3. The assembly of claim 1 or 2, wherein the wall means are obliquely upwardly oriented relative to the longitudinal axis of the guide tube.

4. The assembly of claim 3, wherein the wall means define at least four discrete flow channels.

* * * * *